(12) United States Patent
Vachette et al.

(10) Patent No.: US 6,177,953 B1
(45) Date of Patent: Jan. 23, 2001

(54) INTEGRAL IMAGES WITH A TRANSITION SET OF IMAGES

(75) Inventors: Thierry G. Vachette, Pittsford; Stephen Gulick, Jr., Rochester, both of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 08/882,903

(22) Filed: Jun. 26, 1997

(51) Int. Cl.⁷ .............. H04N 9/47; H04N 13/04; H04N 15/00
(52) U.S. Cl. .............................. 348/59
(58) Field of Search .................. 348/97, 99–100, 348/576, 578, 595, 598, 606, 625, 59; 40/454, 427, 436; 359/463, 819; 430/228, 946; 345/419; 355/22, 33, 75, 125; 396/324, 327, 330, 337, 340; 434/365, 426

(56) References Cited

U.S. PATENT DOCUMENTS

| | | | |
|---|---|---|---|
| 3,268,238 | * 8/1966 | Finkel | 40/427 |
| 3,534,164 | * 10/1970 | Glenn, Jr. | 348/44 |
| 3,538,632 | * 11/1970 | Anderson | 40/427 |
| 3,627,922 | 12/1971 | Goldmark et al. | 348/100 |
| 3,811,213 | 5/1974 | Eaves | 40/437 |
| 3,918,185 | 11/1975 | Hasala | 40/436 |
| 4,506,296 | * 3/1985 | Marraud et al. | 348/59 |
| 4,698,682 | 10/1987 | Astle | 348/586 |
| 4,740,073 | * 4/1988 | Meacham | 352/58 |
| 5,276,478 | * 1/1994 | Morton | 355/22 |
| 5,278,608 | * 1/1994 | Taylor et al. | 355/22 |
| 5,359,712 | 10/1994 | Cohen et al. | 395/161 |
| 5,364,274 | * 11/1994 | Sekiguchi | 434/365 |
| 5,455,689 | 10/1995 | Taylor et al. | 358/450 |
| 5,530,774 | 6/1996 | Fogel | 382/154 |
| 5,614,941 | * 3/1997 | Hines | 348/42 |
| 5,724,758 | * 3/1998 | Gulick, Jr. | 40/454 |
| 5,764,231 | * 6/1998 | Ray et al. | 345/419 |
| 5,782,026 | * 7/1998 | Capie | 40/453 |
| 5,808,792 | * 9/1998 | Woodgate et al. | 359/463 |
| 5,847,808 | * 12/1998 | Goggins | 355/22 |
| 5,896,230 | * 4/1999 | Goggins | 359/619 |
| 5,924,870 | * 7/1999 | Brosh et al. | 434/365 |

\* cited by examiner

*Primary Examiner*—Vu Le
(74) *Attorney, Agent, or Firm*—William F. Noval

(57) ABSTRACT

A method for forming an integral image from first and second sets of images, the integral image to be aligned for viewing through an integral lens sheet. A transition set of images is formed from at least one image of each set, each transition image having a first region being a portion of an image from the first set and a non-overlapping second region being a portion of an image of the second set; Then lines from the first, second and transition sets are interleaved to form the integral image so that the transition set can be viewed intermediate the first and second sets when the image is aligned and viewed through the integral lens sheet. An apparatus which can perform the method, and a product produced by the method, is also provided.

19 Claims, 9 Drawing Sheets

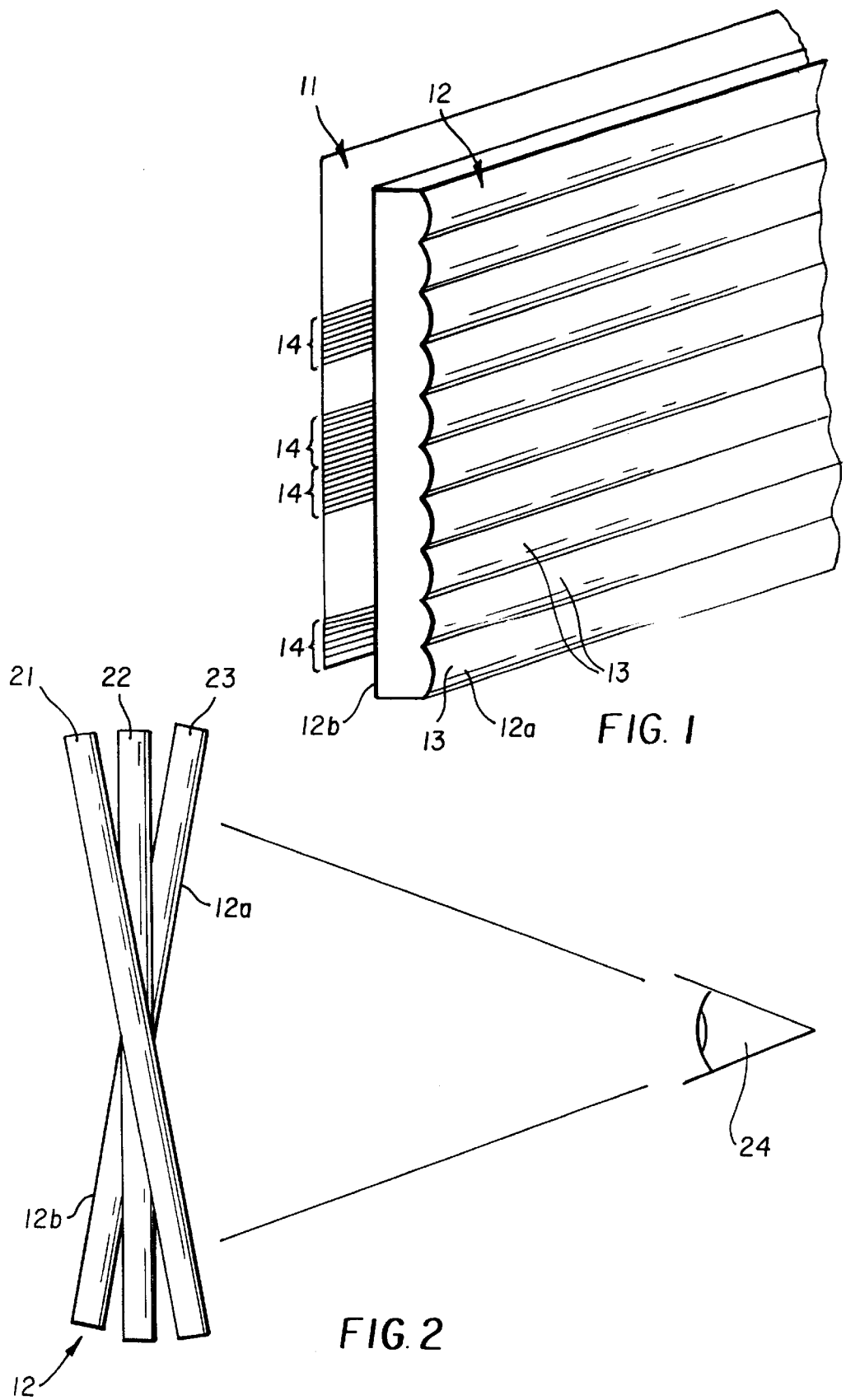

INTEGRAL IMAGES WITH A TRANSITION SET OF IMAGES

FIELD OF THE INVENTION

This invention relates to integral images, and to lenticular images in particular which are composed of interleaved lines from conventional two-dimensional images.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following U.S. Pat. Nos.: 5,391,254; 5,424,533; 5,241,608; 5,455,689; 5,276,478; 5,391,254; 5,424,533 and others; as well as allowed U.S. patent application Ser. No. 07/931,744. Use of barrier viewing sheets having alternating opaque and transparent lines, instead of a lenticular lens sheet, is also well known.

Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. Nos. 3,268,238 and 3,538,632, can be used to convey a number of individual two-dimensional scenes (such as unrelated scenes or a sequence of scenes depicting motion) rather than one or more three-dimensional images. Such elements then, when tilted through a range of angles with respect to a viewer's eyes (by moving the element and/or the viewer's eyes), can display different images (whether different perspectives of the same scene) and/or unrelated images, and/or a sequence of images depicting a motion sequence of events. With improvements in technology, the effects obtained can be startling.

Integral image elements using reflective layers behind the integral image to enhance viewing of the integral image by reflected light, are also described in U.S. Pat. No. 3,751,258, 2,500,511, 2,039,648, 1,918,705 and GB 492,186.

In a typical method of assembling a lenticular type of integral image element, an original negative is exposed from stored digitized data of a composite lenticular image on a film writer. A suitable film writer is the Symbolic Sciences International Fire 1000 and the LVT Model 1620B, available from Light Valve Technology, a subsidiary of Eastman Kodak Company, Rochester, N.Y. A suitable negative exposure technique is disclosed in U.S. Pat. No. 5,276,478. After photographic processing, the negative is printed, typically by a projection enlarger, onto a suitable film- or paper-based photographic print stock. After processing, the lenticular composite print is coated with adhesive, aligned with a lenticular lens sheet, and pressed against the lens sheet to permanently adhere to it in proper registration with the printed lenticular composite image. However, it is also known to write the lenticular image directly onto a back side of a lenticular lens sheet which is coated with a suitable receiving layer, such as disclosed in U.S. Pat. Nos. 5,349,419 and 5,279,912. Furthermore, such "writing" of the lenticular image can be temporary, as in a display produced on a CRT or Liquid Crystal Display ("LCD") screen immediately adjacent the back side.

One difficulty with lenticular images though, occurs when one image of the lenticular image is substantially different in content than the next. For example, when the lenticular image is composed of a motion sequence, the first and last images in the sequence will be considerably different in content with respect to the one or more elements in the image scene which are in motion. As the image element is tilted through a range of angles to observe the images of lenticular image (such as the motion sequence), an undesirable jumping takes place between such images of substantially different content For example, in the case of a lenticular image carrying a single motion sequence, during tilting of the image element through a range of angles to observe the motion sequence, a sudden jumping will be observed between the last and first images of the motion sequence as the angle is increased beyond the primary viewing angle of the images. Such jumping can be very distracting from the viewer's enjoyment of the content of the lenticular image itself. Further, because of this jumping viewers often have problems in seeing all the images and understanding their logical succession, as in the case of a lenticular motion sequence.

Thus, it would be highly desirable to provide viewers with lenticular images with a means which reduces or eliminates such distracting jumping and the resulting problems.

SUMMARY OF THE INVENTION

The present invention then, provides a method of forming an integral image (particularly a lenticular image) from first and second sets of images, the integral image to be aligned for viewing through an integral lens sheet, comprising:
 a) forming a transition set of images from at least one image of each set, each transition image having a first region being a portion of an image from the first set and a non-overlapping second region being a portion of an image of the second set;
 b) interleaving lines from the first, second and transition sets to form the integral image so that the transition set can be viewed intermediate the first and second sets when the image is aligned and viewed through the integral lens sheet.

The present invention further provides an apparatus which can execute the foregoing method, and which uses any suitable means (such as a suitably programmed general purpose process and/or hardware equivalents for all or some of the steps of the method). The present invention further provides an integral image (including a lenticular image) which can be produced by such a method or apparatus. Such integral image elements comprise:
 interleaved lines from a first set of images, a second set of images, and a transition set of images, so that the transition set can be viewed intermediate the first and second sets when the image is aligned and viewed through the integral lens sheet;
 wherein each transition image has a first region being a portion of an image from the first set and a non-overlapping second region being a portion of an image of the second set.

An integral image element of the present invention (particularly a lenticular image element) includes an integral image of the present invention (particularly a lenticular image) aligned with an integral viewing sheet (such as lenticular lens sheet or barrier sheet) for viewing of the integral image through the viewing sheet.

The methods, apparatus, and integral images of the present invention then, provide a means in integral images in which jumping between images of substantially different scene content, such as occurs when tilting a lenticular element to view a motion sequence, can be reduced or eliminated to allow a user to view the integral image with little or no distraction.

BRIEF DESCRIPTION OF THE DRAWINGS

Embodiments of the invention will now be described with reference to the drawings, in which:

FIG. 1 is an enlarged perspective view of a portion of lenticular image element showing the lenticular image spaced apart from the lenticular lens sheet for clarity.

FIG. 2 is a side view of a user viewing a conventional lenticular image in the element of FIG. 1 by rocking it back and forth through an angle .

To facilitate understanding, identical reference numerals have been used, where possible, to designate identical elements that are common to the figures.

DETAILED DESCRIPTION OF THE INVENTION

Figure 3:
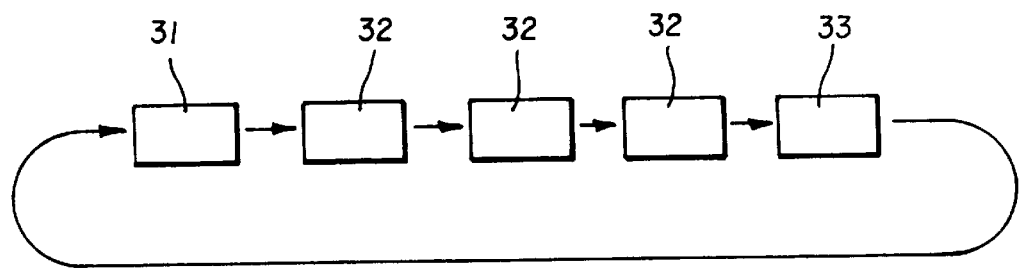
FIG. 3 is a schematic illustrating what the user would see from the action of FIG. 2 with a conventional lenticular image present.

In the present invention, it will be understood that a "set" of images includes one or more images. The images may be of any type, and include any number or all of the images being images of real world scenes or computer generated images. The first and second sets of images (again, each set being one or more images) include images which are unrelated in scene content (that is, one or more or all of the elements in one scene are different from the elements in the other scene) or images which are related such as being from a single sequence of motion images. For example, one set may be one image or a sequence of plural images from a beginning of one motion image sequence while the other may be one image or a sequence of plural images form the end of another motion image sequence.

It will be appreciated in the present invention, that while the integral lens sheet could be a fly's eye lens sheet it is more preferably a lenticular lens sheet with lenticules on a front surface, in which case the corresponding image used with the sheet is a lenticular image. Alternatively, the integral lens sheet could have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plane which may be inherent in the lens construction. Consequently, the curvature on the back side may be of such a shape as to match the curvature of the focal plane of the lens. Further, by an "integral" image is referenced an image composed of segments (interleaved lines, in the case of a lenticular image) from at least one complete image (and typically more than one image), which segments are aligned with respective individual lenses so that each of the one or more images is viewable when a user's eyes are at the correct angle relative to the imaging element. An integral lens web may be a continuous web of any integral element lens sheet type.

It will be appreciated throughout this application, by a "processor" is referenced a suitable signal processor, such as a suitably programmed general purpose digital processor or hard wired equivalent circuitry. These techniques can also be used to correct for curvature of a lenticule axis.

As to the receiving medium on which the integral image is written, this can simply be the back side of the integral lens sheet (which in a conventional integral lens sheet is opposite shaped lens surfaces, such as the semi-cylindrical shaped lens surfaces of a lenticular lens sheet). Alternatively, the image receiving medium could be one or more layers coated on the back side, such as a photosensitive layer or layers (which may in particular be any known photographic layer or layers). It will be understood though, that if a transparent substrate bearing one or more photographic layers or other writeable image bearing layers using thermal or inkjet electrophotographic methods (such as the transparent base of a conventional photographic film) is attached to a lenticular lens sheet by adhering the transparent substrate, the transparent substrate can then be considered to be part of a completed lenticular lens sheet (such that the photographic layers are still part of the back side of the completed lenticular lens sheet). Additionally, the image receiving medium on the back side, can be covered with a protective layer either before or after writing the image. In the case of such a protective layer covering before writing the image, the protective layer can be transparent so that writing can be done by a light beam illuminating photosensitive layers on the back side. It will also be appreciated that the methods of the present invention can be applied to integral images (and particularly lenticular images) which can exhibit a wide range of effects including motion, depth, flip (that is, apparently unrelated images), and other lenticular related effects.

In this application, by a perspective sequence of images is referenced a sequence of images (at least two) in an integral image which are views of a scene taken from different perspectives (that is, from different angular positions) and thereby provide a three-dimensional effect when viewed through the integral lens sheet. Such a sequence is also referred to as a "depth image". If at least three different perspectives images are used, this can include the ability to at least partially look around an object in the scene. A motion sequence is a sequence of images (such as two, three, four or more images) each image of which has at least one (or most, or all) scene element in common but which changes location, shape or size within the scene in a logical manner through the sequence. Motion image sequences for lenticular images are generally two-dimensional images but can be made from a perspective sequences. By a two-dimensional image is referenced an image which, when aligned and viewed through an integral lens, does not have any viewable depth element (that is, it does not appear three-dimensional and the viewer cannot look around it at all). By a scene element in this regard, is referenced the same view of the same object (which includes the object appearing to be the same size).

Turning now to the drawings, a typical lenticular image element, as seen on FIG. 1, includes a lenticular image (11) containing sets 14 of interleaved lines (only some sets 14 being shown in FIG. 1 for clarity), taken from individual images. Each set 14 contains a line from each image, in a manner well known in the lenticular imaging art. The lenticular image element also includes a lenticular lens sheet (12). Lens sheet (12) includes on a front side 12a, plural adjacent and parallel straight lenticules 13 with their convex lens surfaces. Lenticular image 11 is typically positioned adjacent a back side 12b of lens sheet 12 (although it could be spaced therefrom) with each set of lines 14 aligned with a corresponding lenticule 13. Such alignment does not necessarily require that all lines of a set 14 will be directly beneath a corresponding lenticule 13 (although they often will be), since in some cases such as described in U.S. Pat. Nos. 5,276,478 and 5,278,608, some of the lines of a set may in fact be beneath an adjacent lenticule. Image 11 when aligned with lens sheet 12, are together sometimes referenced as a lenticular image element. When image 11 and lens sheet 12 are positioned horizontally as shown in FIG. 1, with the lenticules of sheet 12 parallel to the plane of a viewer's eyes (sometimes referenced as a user or observer). lens sheet 12 allows the observer to see only one of the images at a time. Note that if the lenticular image element of FIG. 1 is rotated 90 degrees from the horizontal position of FIG. 1 so that the lenticules are perpendicular to a viewer's eyes, two images can be seen at the same time, thus enabling viewing of a depth lenticular image in a known manner. With regard to FIG. 2 an observer (24) can see all the images by successively tilting the display through an angle to various different positions (21)(22)(23), each one corresponding viewing of one specific image. The images can be still images, depth images (which are properly observed with the lenticular image element oriented vertically), or motion sequences or any combination of these three. In the case of a motion sequence, the impression of movement is achieved by tilting the lenticular image through an angle and at such a speed that the sequence of images embedded in it appears to the observer at an appropriate frame rate. In FIG. 2, lenticules 13 are not visible since in practice they are typically of very small width (for example, less than 1 millimeter).

Lenticular images exhibit a specific behavior which consists of displaying over and over again the same sequence of images, when the lenticular image is tilted back or forth further than the full sequence of images. This behavior is inherent to the technology and will be described in detail later, but is important to understand at this point. As sketched on FIG. 3, when playing from the first image (31) through the intermediate images (32) to the last image (33), the first image (31) is then displayed again. This behavior usually causing a jumping in image content, and puzzles the observer who does not understand that the sequence is starting over again and perceives it as a sudden and unexpected jump between images. Furthermore, the observer often focuses his attention on this unexpected event, and does not understand where is the beginning and the end of the sequence. Finally, the observer is disappointed because he or she is not able to enjoy at the first glance the lenticular image.

Figure 4:
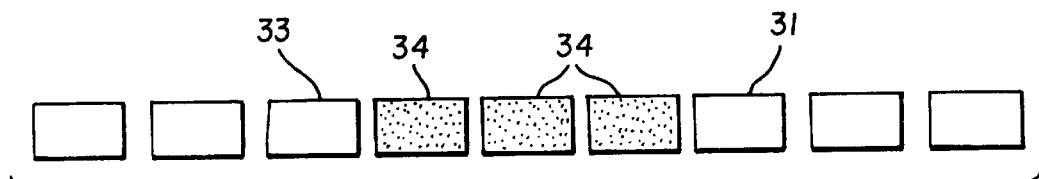
FIG. 4 is a schematic illustrating a sequence of images making up a lenticular image of the present invention, and which sequence includes a transition set of images.
Figure 5:
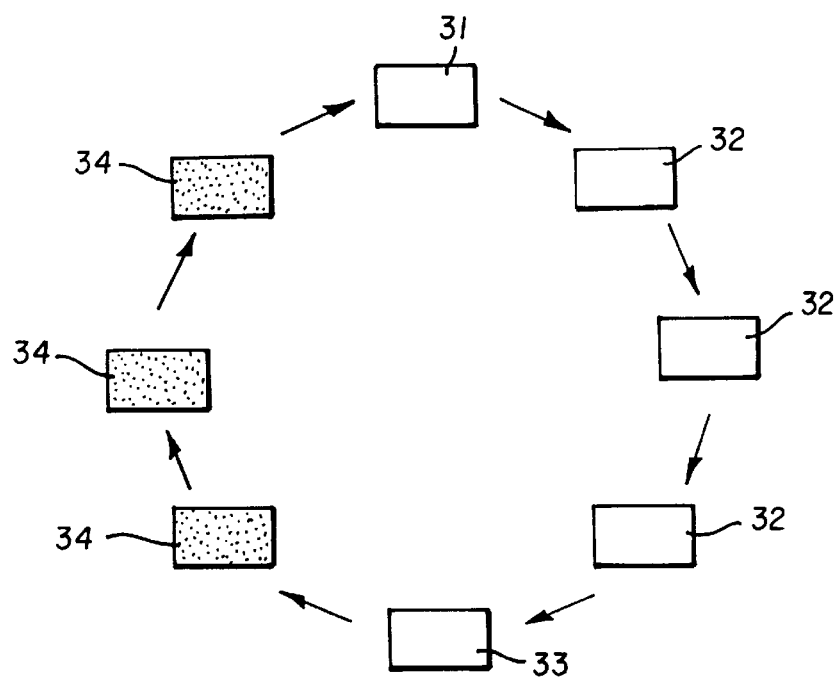
FIG. 5 is a schematic similar to FIG. 3 but illustrating what the user would see from the action of FIG. 2 but with the lenticular image element carrying a lenticular image made of the sequence of FIG. 4.

The present invention introduces, as seen on FIG. 4, a transition set of images (34) which are interleaved with the last image (33) of the sequence and the first (31) of the sequence. By using such transition images, as illustrated in FIG. 5, when the lenticular image element is tilted to view from the first image (31) through the intermediate images (32) to the last image (33) and then the transition set images (34), all of the images are perceived as a loop by the observer.

The reason for which, while playing a lenticular image, the same sequence can be displayed many times in a row, is going to be explained now from the technical point of view. This explanation will be given for the case of a lenticular lens sheet, but the understanding can be extended to the other technologies such as fly's eye lens sheets and images or to lenticular images using a barrier viewing sheet having alternating opaque and transparent slits.

Figure 6:
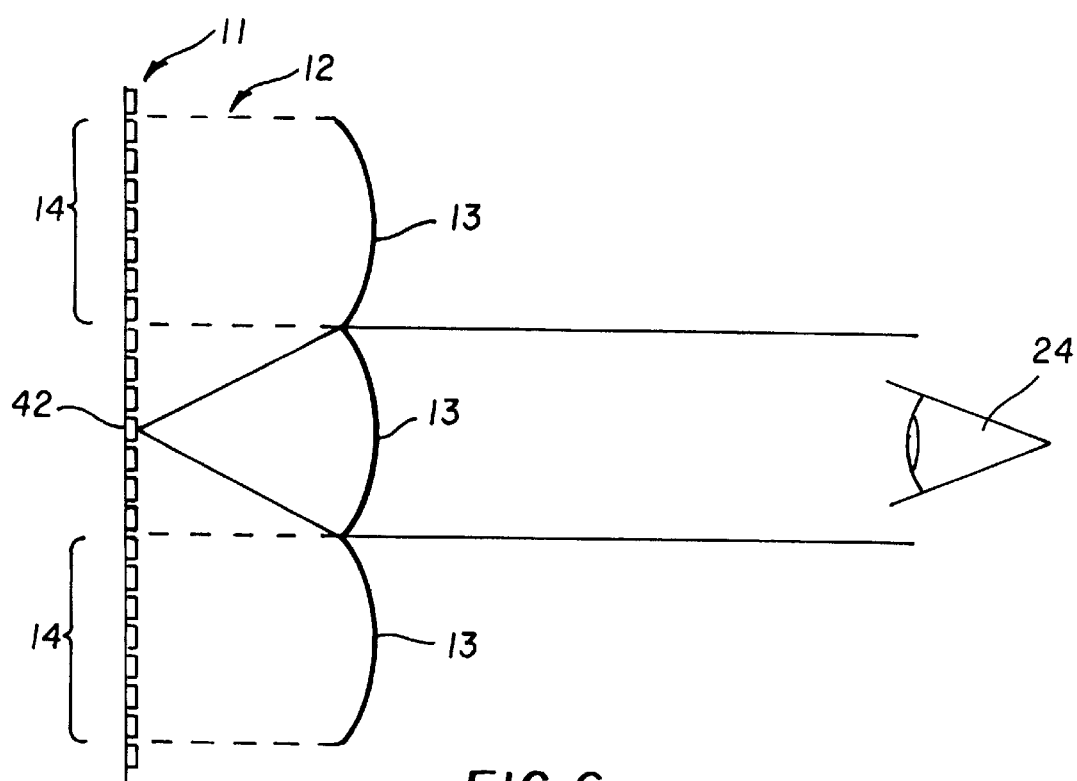
FIGS. 6 to 8 are a side views of a user looking at different image lines of a lenticular image as a lenticular image element is tilted through a range of angles.
Figure 7:
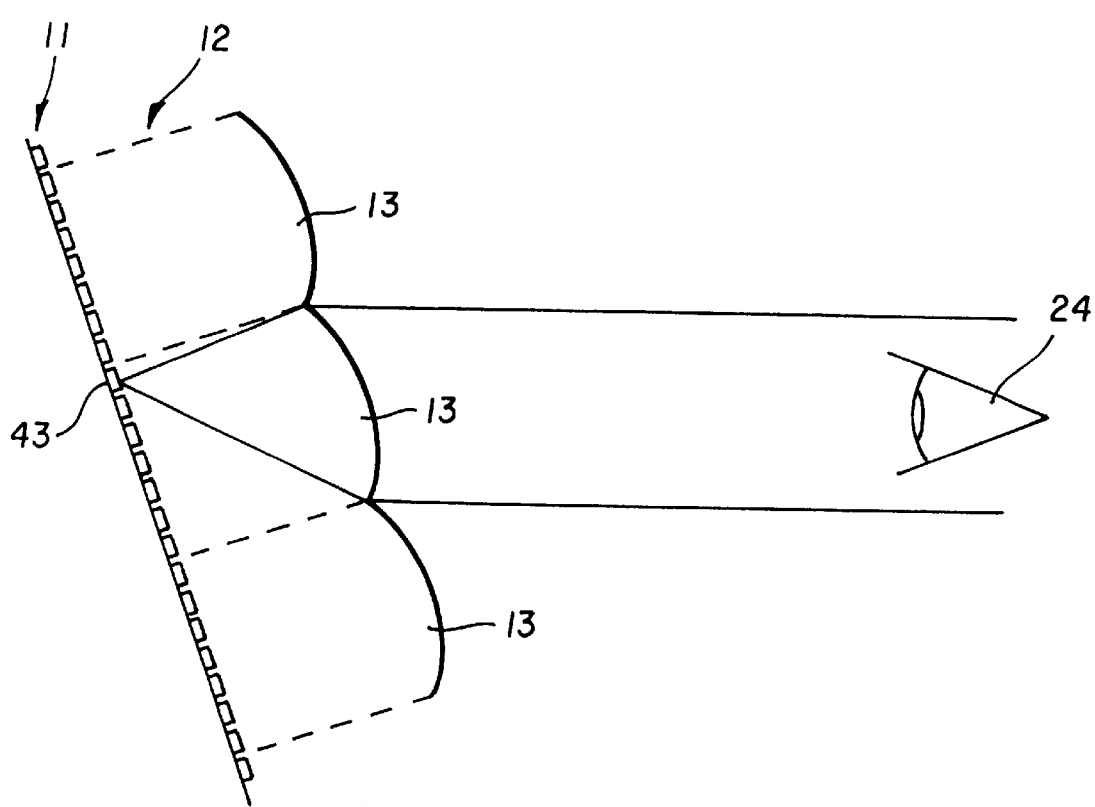

The various images embedded in a lenticular image are decomposed into strips or lines (which may be one or more pixels in width) and these are interleaved and aligned behind a corresponding lenticule at its focal point, in a known manner. Such interleaving is, for example, described in U.S. Pat. Nos. 4,506,296, 5,278,608, 5,276,478, 5,455,689, and 3,534,164. Thus, as seen on FIG. 6 when the observer (24) is looking through the lenticular array, he or she can see, projected to the infinite, the image line (42). By seeing simultaneously all the lenticules, one can see simultaneously all the image lines of one image and hence can see the complete corresponding image. As shown in FIG. 7, as the view angle of the observer (24) relative to the lenticular image is altered, an image line (43) from another image will be seen by the observer behind the lenticule array (and hence the observer sees a different image). Because the width of each image line is much narrower than the width of the lenticule itself, many image lines can be behind the same lenticule (the number of different image lines corresponding to the number of images that can be seen). The image which is then seen by the observer depends on the view angle of the lenticular image.

Figure 8:
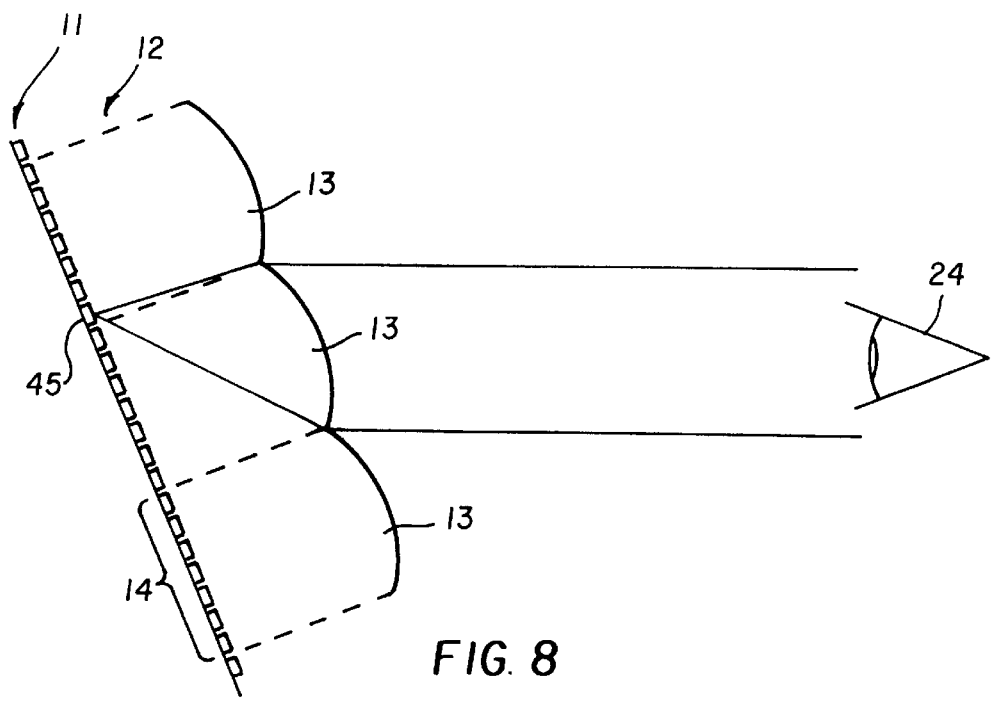
Figure 9:
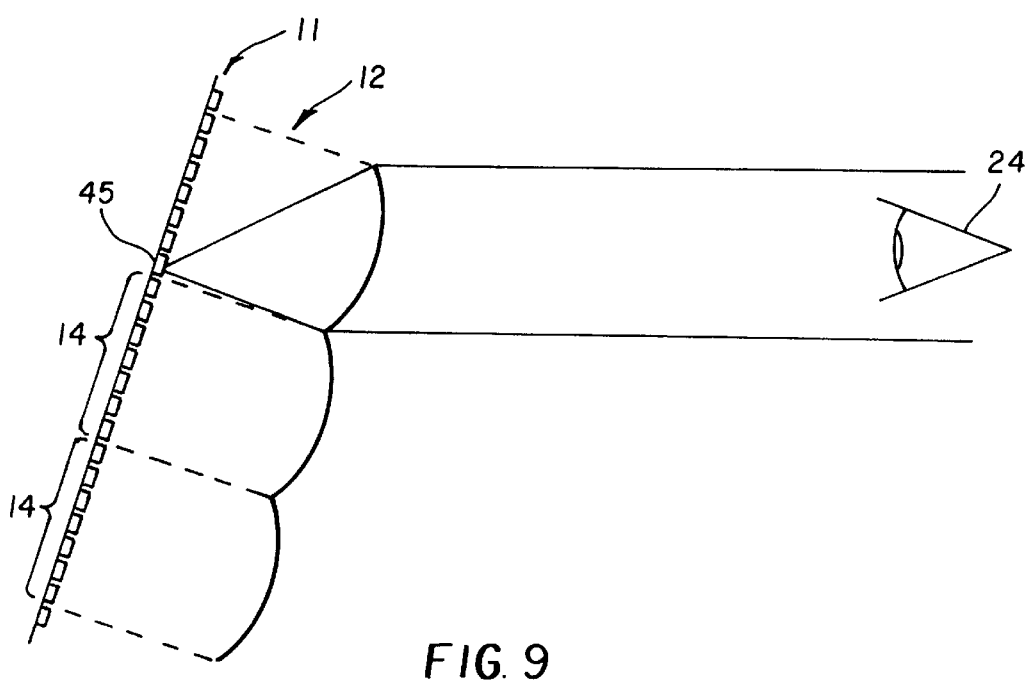
FIG. 9 is a view similar to that of FIGS. 6 to 8 but with the lenticular image element tilted at a different angle.

However, the space available behind each lenticule is limited and only a limited number of image lines can take place behind each lenticule. Thus, as seen on FIG. 8, when the lenticular image is tilted further than the last image line under the lenticule, the observer (24) can see the first image line (45) under the adjacent lenticule. This phenomenon implies that in the case where the images have a logical order, the lenticular image jumps suddenly from the last image to the first image. As seen on FIG. 9, the image seen by the observer (24) in this case is also the first image line (45) under the adjacent lenticule.

Thus it is important to understand that this specific behavior which is a problem for the observer, will be turned into an advantage by the present invention. By using a transition set of images between the end and the beginning of a series of images encoded on a lenticular image the way these images are displayed is converted into a loop mode, as described on FIG. 5, instead of the play and repeat mode shown on FIG. 3. The loop mode leads to an other advantage which is the fact that the notion of beginning and end of the series of images no longer has any meaning, because there is no beginning or end in a loop.

However, there is a need to select a first image to be encoded on the lenticular image. This first image can be any of the images in the sequence, and the sequence in this case will look exactly the same as long as all the images are encoded in the right order. The only difference is the fact that the lenticular image has to be tilted to a different angle to see the first image. Therefore, it may be appropriate to chose carefully the angle of the lenticular image versus the sight axis of the observer so that the beginning of the content of the lenticular image becomes easier to find. One possibility is to encode this first image so that it appears to the observer when the display is hold perpendicular to the sight axis.

It should be noted that the notion related to the selection of a first image is independent of the presence or absence of a transition in the series of images and can be implemented in a series of images without any transition. However, transitions are required to fully take advantage of this loop mode by displaying a continuous content versus a jumpy content when no transition has been included.

The present invention introduces a set of transition images which typically has from one to twenty and more specifically from two to four images positioned between other images such as the beginning and end of a sequence of images. It has been discovered that the power of interpolation of the human eye is such that the transition looks smooth when it is made of only a few images typically from two to four and when they are played fast enough. However, the number of images that can be selected to create the transition is not limited to four and can be extended as required.

A pattern for the transition image set can be chosen among the following, but are not limited to these, and any kind of transition known to one skilled in the art is suitable for the purpose we are dealing with.

Figure 10:
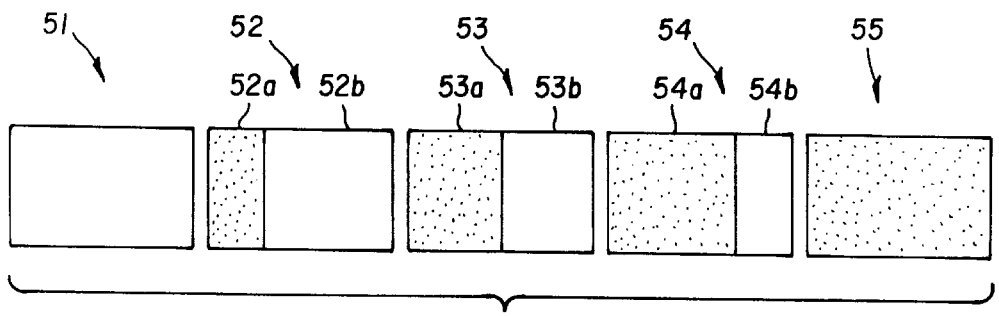
FIG. 10 is a schematic showing in more detail a sequence of images forming a transition set of images in a lenticular image of the present invention.
Figure 11:
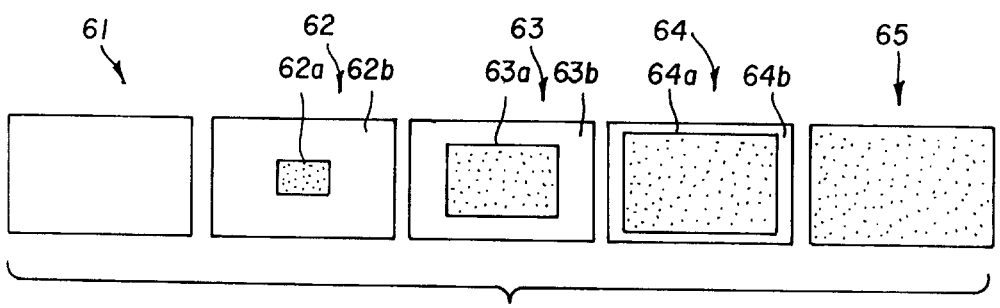
FIG. 11 is schematic similar to FIG. 10 but showing a sequence of images forming another transition set of images in a lenticular image of the present invention.
Figure 12:
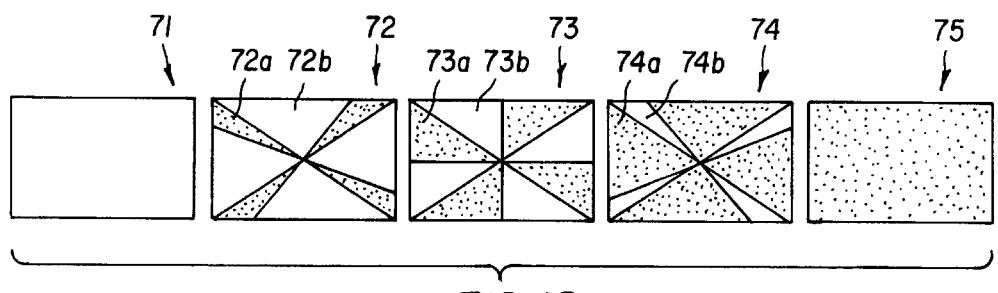
FIG. 12 is a schematic similar to FIG. 5 but showing a sequence of images forming still another transition set of images in a lenticular image of the present invention.

A first kind of transition shown in FIG. 10, consists of replacing progressively one image (51) by the other (55) starting at one margin and sweeping through transition set images 52, 53, 54 to the other margin. A second kind of transition shown in FIG. 11, consists in displaying the second image (65) into a geometric form starting at a given point of the first image (61) and expending through transition set images (62)(63)(64) until it covers the full area of the lenticular image. A third kind of transition, described in FIG. 12, consists in the progressive replacement of the first image (71) by the second image (75) following a rotational pattern centered on one point of the image which covers gradually (72)(73)(74) the first image. A fourth kind of transition consists in the progressive dissolve of one image into the other by the progressive replacement of all the pixels of one of the image by the pixels of the other image using a geometric or random pattern. Each one of these transitions can be mathematically built up and then sampled down to a few images typically from one two twenty and then be used to construct the desired transition. The transitions can be placed at different locations in the succession of images and some examples will be described hereafter.

In each of the foregoing types of transitions, it will be seen that the progressing through the sequence of transition images, the region occupied by a portion of a second set image expands, while the region occupied by a portion from the first set contracts. For example, referring to FIG. 10 if image 51 is regarded as the image of the first set and image 55 regarded as the image of the second set, then the transition set of images consists of images 52, 53, 54 and second regions 52*a*, 53*a*, 54*a* are portions of the second set image 55, while first regions 52*b*, 53*b*, 54*b* are portions of the first set image 51. This is similarly true of images 61–65 and the regions 62*a*, 63*a*, 64*a* and regions 62*b*, 63*b*, 64*b* in FIG. 11, as well as images 71–75 and regions 72*a*, 73*a*, 74*a* and regions 72*b*, 73*b*, 74*b* in FIG. 12. Note that the regions from the first and second set of images do not overlap. It will also be appreciated that while each region a corresponding portion of its image (that is, second region 52*a* can be taken from an identically located and sized portion of second image 55), this need not be the case. In particular the portions chosen from images from the first and second sets need not each be a continuous portion (although they can be). For example, second region 52*a* could be composed of horizontal image lines (as viewed in FIG. 5) which are from interspersed locations on second image 55 (for example, every third line of image 55).

It also should be noted that in order to obtain good looking transitions, the images that are preferably selected to build the transition set of images are copies of the image from the first and second image sets, in the case of still and depth images, and are preferably a sequence of images interrelated temporally to each other in the case of a motion sequence and sampled at the beginning or at the end (or both) of the motion sequence. These images can be from the motion sequence itself or also can be sampled or extrapolated at the beginning or at the end of the motion sequence.

A method of creating these transition image sets in the case of still images and motion sequences, will now be described. After the descriptions of these two cases it will become apparent how to construct other different types of transition set images.

Figure 13:
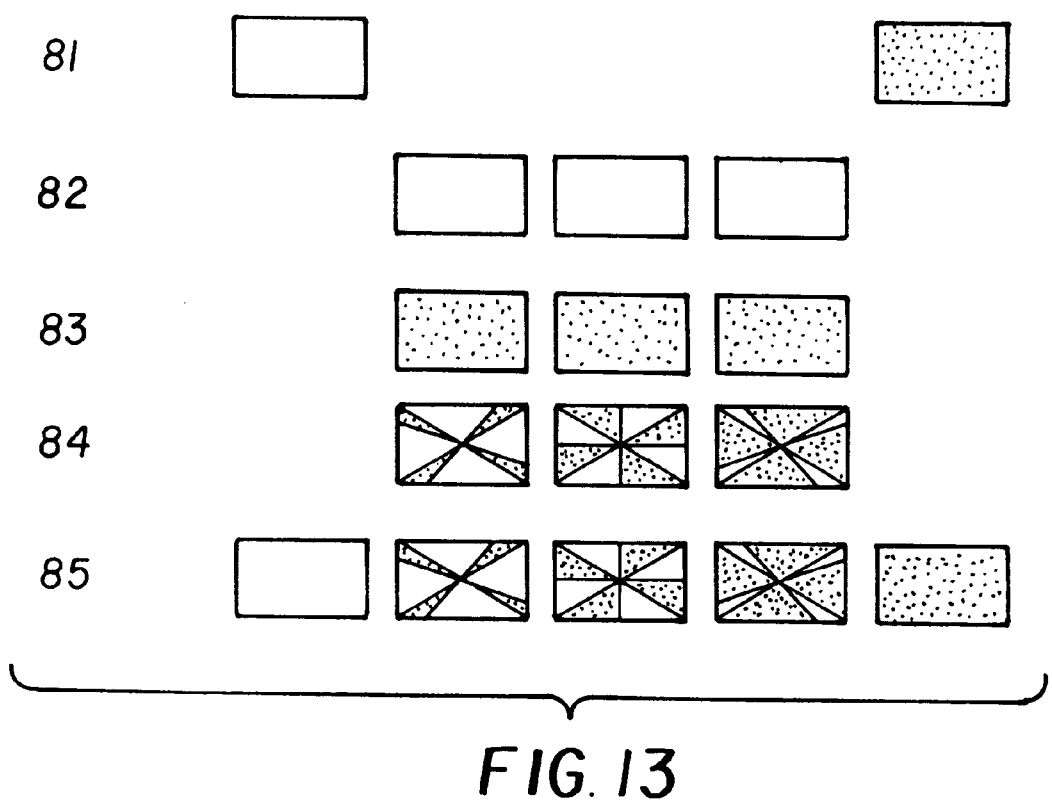
FIG. 13 is a schematic illustrating application of one method of the present invention to form a transition set of images such as seen in FIG. 12.

Referring first to FIG. 13, there is shown a method for generating a transition set between two still images (line 81). The first image is replicated into one set of three images (line 82). In the same way, the second image is replicated into one set of three images (line 83). The transition images, using the new images selected for this purpose are then generated using a set of masks 84 which, in the example in FIG. 13, represent the transition pattern described in FIG. 12. Finally, each of the masks shown in line 84 are applied in turn to a copy of the image of the first set and second set. to obtain the transition set between the two images, to produce a complete image set 85.

Figure 14:
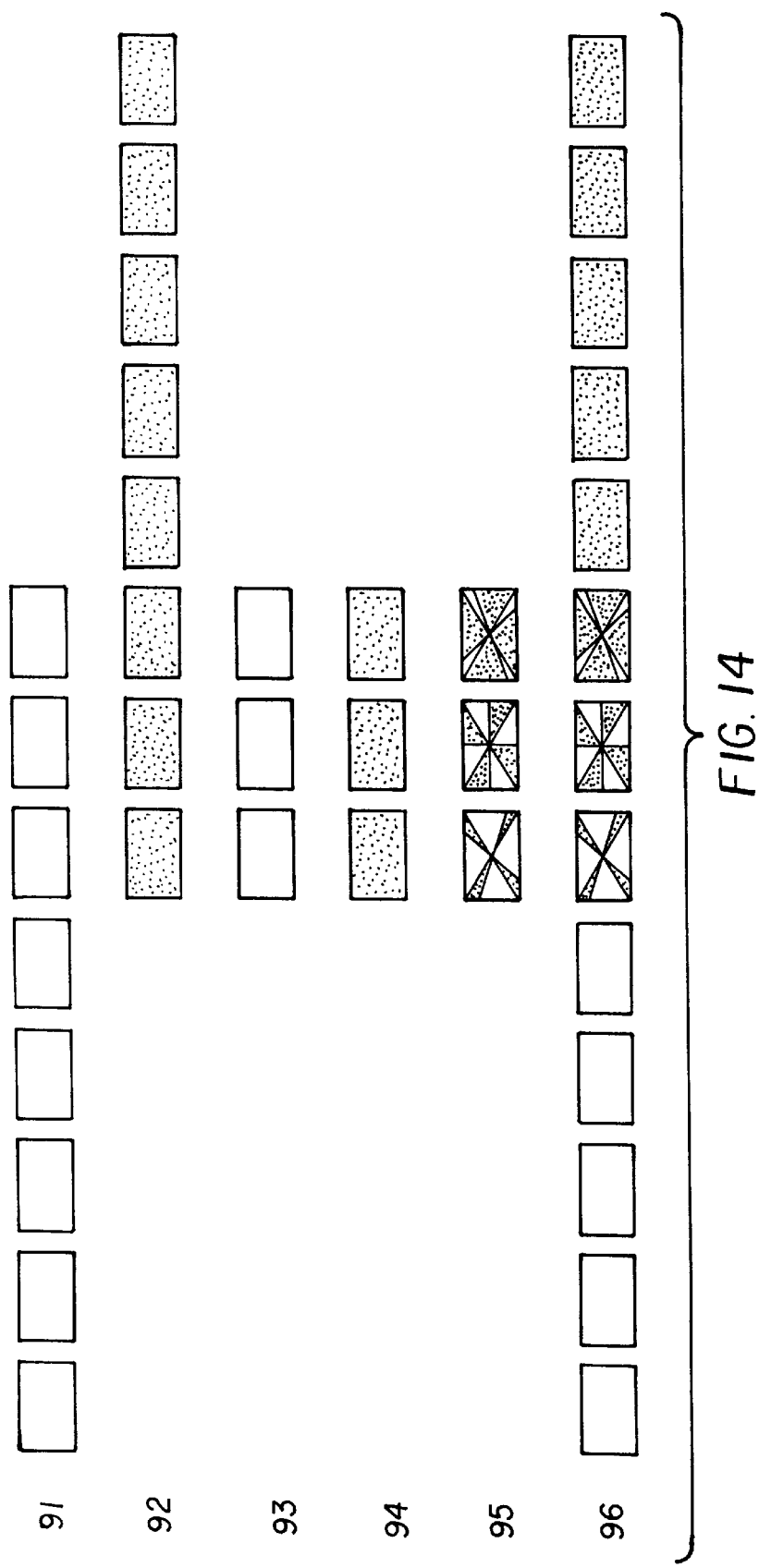
FIG. 14 is a schematic similar to FIG. 13 but illustrating another method of the present invention as used to form a transition set between two different motion image sequences.

A second method is preferably used (see FIG. 14) when using two sequences of motion lenticular images (line 91 and line 92). In order to build a transition set, a few images (line 93 and line 94) have to be selected at the end of the first motion sequence (line 93) and at the beginning of the second motion sequence (line 94). The images in line 93 then can be considered a first set of images, while those in line 94 can be considered a second set of images. Note that as shown in FIG. 14, images of these sets of equal rank are vertically aligned. By "rank" in this context is referenced the position of each image in the sequence of the first or second sets shown in lines 93, 94. An alternative to this is to sample additional images preceding or following the motion sequence, or to calculate by extrapolation a few additional images for each motion sequence. The images selected to build the transition set can then be any of these or any combination of these as long as the action of the motion sequence is still on going during the sequence. For each transition set, the number of images is typically between one and twenty depending on the total number of images available based on lenticular pitch and the printer resolution, as well as other considerations such as the desired smoothness of the selected transition. The selected images to build the transition are combined together in accordance with the predetermined transition image mask pattern 95. In the case of the example on FIG. 14, the transition mask pattern is the one described in FIG. 12. Finally the sequence of masks 95 are applied to the equally ranked images of the first and second sets 93, 94 to produce the first and second image sequences with the transition set therebetween as shown in the completed image set 96.

The images of the first and second sets, and the transition set, are then interleaved in a known manner to form a lenticular image which can then be printed, and the printed image aligned with a corresponding lenticular lens sheet. The result will be that the transition set will be viewable through the lens sheet as it is tilted through an angle, at a location between the first and second image sets. In the above and all other methods herein, all of the image processing is preferably accomplished using a suitably programmed microprocessor operating on the images in the form of digital image signals. Using computers to perform such interleaving is well known in the art of lenticular images. It will also be appreciated that while the interleaving step is described above as being performed after forming a transition set of images, it can be performed during or even before forming the transition set (in the latter case the transition set can be formed using lines from the images of the first and second sets).

Figure 15:
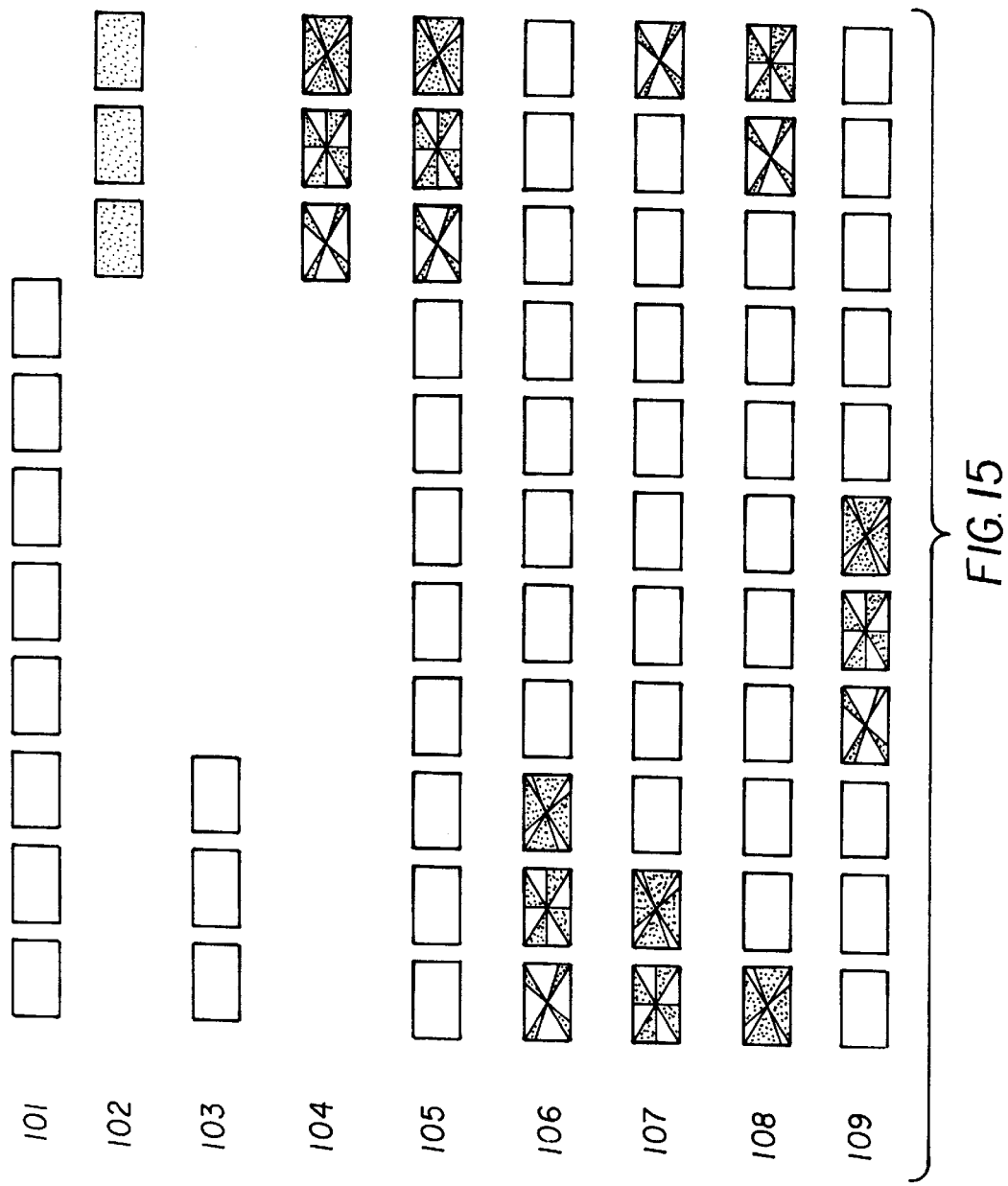
FIG. 15 is a schematic similar to FIG. 13 but illustrating another method of the present invention as used to form a transition set between the beginning and end images of a single motion sequence.

Another kind of transition is the type required when dealing with a single motion image sequence that have to be played in some sort of loop mode. When reaching the last image, the first image of the sequence is then displayed right after, as previously explained (FIG. 3). However, a transition can take place at that point so that it becomes clear to the observer that a new sequence, which is, in this case, the same sequence is starting over. As seen in FIG. 15, to build such a transition set out of the single sequence of images (line 101), a few additional pictures can be selected at the beginning or at the end (line 102 and line 103, respectively) or at both ends of the motion sequences. In each one of these sets, the number of pictures is going to be the number of transition images and typically comprises between one and twenty depending on the total number of images available and the desired smoothness of the transition. In the example in FIG. 15, two sets of three images have been selected at the beginning (line 103) or at the end (line 102) of the motion sequence.

In addition, in FIG. 15, the images selected at the beginning belong to the original motion sequence, while the images at the end have been added to the original sequence, by either sampling some additional images from an original source (such as a videotape) or mathematically extrapolating some new images. Then the images at the beginning (line 103) and at the end (line 102) of the motion sequences that have been selected are combined together (line 104) in accordance with a predetermined transition mask pattern. In FIG. 15 the transition mask pattern is the one shown in FIG. 12. Those transition images can take place in the motion sequence at the beginning (completed motion sequence 106) at the end (completed motion sequence 105) or at both ends (completed motion sequences 107 and 108) or the motion sequence can be rebuilt with a transition in the middle (completed motion sequence 109). This is assuming that each line of the first image of any of the completed sequences 106–109 is positioned to be the first line under each lenticule (it will be understood of course, that the remainder of the images of those sequences will be placed under each lenticule in the order as shown in those sequences). However, it may be best to split the transition image sequence equally into two sub-sets, one at the beginning one at the end so that the observer can see most of the motion sequence perpendicular to his axis of sight.

Figure 16:
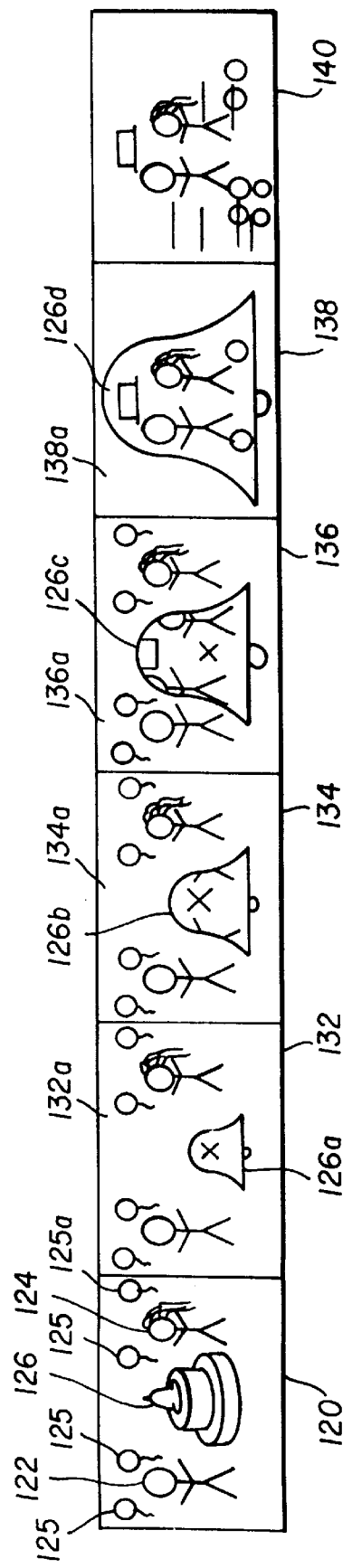
FIG. 16 illustrates the application of the present invention to images which are interleaved into a lenticular image.

It will be appreciated that at least one of the first or second regions can be in the shape of a real world object, or can be in the shape of a view of a scene element from the first or second set (which may or may not be a real world object). When the region is a view of a scene element from one of the sets, it may be the same view as shown in an image of the set, or it may be a different view (that is, from a different perspective of an object in the scene). FIG. 16 illustrates this concept. In FIG. 16 the first region in transition set images 132, 134, 136, 138 is indicated by 126a through 126d while the second region is regions 132a, 134a, 136a and 138a. Each of regions 126a through 126d is in the shape of the scene element being the bell 126 in the first image 120 (other scene elements being people 122, 124 and balloons 125), while the second region is the remainder of the transition set images. Regions 126a through 126d expand in size proceeding from transition image 132 to 138, and contains a portion of the image 120, while the regions 132a, 134a, 136a, 138a contain corresponding image portions from a second image 140.

The invention has been described in detail with particular reference to certain preferred embodiments thereof, but it will be understood that variations and modifications can be effected within the spirit and scope of the invention.

| | |
|---|---|
| 11 | Lenticular Image |
| 12 | Lenticular Lens Sheet |
| 12a, 12b | Lens Sheet Front Side, Back Side |
| 13 | Lenticules |
| 14 | Sets of Interleaved Lines |
| 21, 22, 23 | Display Positions |
| 24 | Observer |
| 31 | First Image |
| 32 | Intermediate Images |
| 33 | Last Image |
| 34 | Transition Set of Images |
| 42, 43, 45 | Image Lines |
| 51 | First Set Image |
| 52, 53, 54 | Transition Set Image |
| 52a, 52b | Second Region, First Region |
| 53a, 53b | Second Region, First Region |
| 54a, 54b | Second Region, First Region |
| 55 | Second Set Image |
| 61 | First Set Image |
| 62, 63, 64 | Transition Set Images |
| 62a, 62b | Regions |
| 63a, 63b | Regions |
| 64a, 64b | Regions |
| 65 | Second Set Image |
| 71 | First Set Image |
| 72, 73, 74 | Transitional Set Images |
| 72a, 72b | Image Regions |
| 73a, 73b | Image Regions |
| 74a, 74b | Image Regions |
| 81 | Two Still Images |
| 82, 83 | Set of Three Images |
| 84 | Image Masks |
| 85 | Complete Image Set |
| 91, 92 | Motion Lenticular Images |

| | |
|---|---|
| 93 | First Motion Sequence Images |
| 94 | Second Motion Sequence Images |
| 95 | Transition Masks |
| 96 | Completed Image Set |
| 101 | Single Sequence of Images |
| 102, 103 | Sets of Three Images |
| 104, 105, 106, 107, 108, 109 | Completed Motion Sequences |
| 120 | First Image |
| 122, 124 | Scene Elements (people) |
| 125 | Scene Elements (Balloons) |
| 126 | Scene Element (Bell) |
| 126a, 126b, 126c, 126d | First Regions |
| 132 | Transition Set Images |
| 132a | Second Region |
| 134 | Transition Set Images |
| 134a | Second Region |
| 136 | Transition Set Images |
| 136a | Second Region |
| 138 | Transition Set Images |
| 138a | Second Region |
| 140 | Second Image |

What is claimed is:

1. A method for forming an integral image from first and second sets of images, the integral image to be aligned for viewing through an integral lens sheet, comprising:

a) forming a transition set of images from at least one image of each set, each transition image having a first region being a portion of an image from the first set and a non-overlapping second region being a portion of an image of the second set; and b) interleaving lines from the first, second and transition sets to form the integral image so that the transition set can be viewed intermediate the first and second sets when the image is aligned and viewed through the integral lens sheet.

2. A method according to claim 1, wherein the transition set is formed during the interleaving step.

3. A method for forming a lenticular image from first and second sets of images, the lenticular image to be aligned for viewing through a lenticular viewing sheet, comprising:

a) forming a transition set of images from at least one image of each set, each transition image having a first region being a portion of an image from the first set and a non-overlapping second region being a portion of an image of the second set; and b) interleaving lines from the first, second and transition sets to form the lenticular image so that the transition set can be viewed intermediate the first and second sets when the image is aligned and viewed through the lenticular viewing sheet.

4. A method according to claim 1, wherein the transition set comprises a sequence of transition images through which sequence the region occupied by a portion of the second set image expands while the region occupied by a portion from the first set contracts.

5. A method according to claim 4, wherein step (a) comprises:

obtaining a sequence of masks which define the first and second regions for each transition image; and applying each mask in turn to an image of the first and second sets to obtain the sequence of transition images.

6. A method according to claim 5, wherein the image of the first and second sets is replicated and each mask is applied in turn to a replicated image of the first and second sets.

7. A method according to claim 4, wherein the first and second sets comprise equal numbers of plural images from a beginning and an end of at least one motion sequence or perspective sequence, and wherein each image of the transition set is formed from equally ranked images of the first and second sets.

8. A method according to claim 7, wherein the first and second sets are plural images from opposite ends of a single motion or perspective image sequence.

9. A method according to claim 7, wherein the first set is from the end of one motion or perspective image sequence, and the second set is from the beginning of another motion or perspective image sequence.

10. A method according to claim 4, wherein the first set comprises a plurality of images from a beginning or an end of a motion or perspective sequence and the second set is a single image, and wherein step (a) comprises obtaining a sequence of masks which define the first and second regions for each transition image, and applying each mask in turn to a corresponding image of the first set and the single image of the second set to obtain the sequence of transition images.

11. A method according to claim 3, wherein each of the first and second sets comprise a motion sequence or a perspective sequence, and wherein the transition set is formed from at least the last image of one sequence and the first image of the other sequence.

12. A method according to claim 3, additionally comprising printing the lenticular image and aligning the lenticular image with a lenticular lens sheet.

13. A method according to claim 3, wherein at least one of the first and second regions is in the shape of a real world object.

14. A method according to claim 3, wherein at least one of the first and second regions is in the shape of a view of a scene element from the first or second set.

15. A method according to claim 3, wherein at least one of the first and second regions is in the shape of a scene element of the first or second set.

16. An apparatus for forming an integral image from first and second sets of images, the integral image to be aligned for viewing through an integral lens sheet, comprising:

a) means for forming a transition set of images from at least one image of each set, each transition image having a first region being a portion of an image from the first set and a non-overlapping second region being a portion of an image of the second set; and b) interleaving means for interleaving lines from the first, second and transition sets to form the integral image so that the transition set can be viewed intermediate the first and second sets when the image is aligned and viewed through the integral lens sheet.

17. An apparatus for forming a lenticular image from first and second sets of images, the lenticular image to be aligned for viewing through a lenticular viewing sheet, comprising:

a) means for forming a transition set of images from at least one image of each set, each transition image having a first region being a portion of an image from the first set and a non-overlapping second region being a portion of an image of the second set; and b) interleaving means for interleaving lines from the first, second and transition sets to form the lenticular image so that the transition set can be viewed intermediate the first and second sets when the image is aligned and viewed through the lenticular viewing sheet.

18. An apparatus according to claim 17, wherein the transition set forming means forms the transition set comprising a sequence of transition images through which sequence the region occupied by a portion of the second set image expands while the region occupied by a portion from the first set contracts.

19. An apparatus according to claim 18, wherein the transition set forming means:

obtains a sequence of masks which define the first and second regions for each transition image; and applies each mask in turn to an image of the first and second sets to obtain the sequence of transition images.

* * * * *